US012430962B2

(12) United States Patent
Wang et al.

(10) Patent No.: US 12,430,962 B2
(45) Date of Patent: Sep. 30, 2025

(54) BATTERY LIFE PREDICTION USING A GLOBAL-LOCAL DECOMPOSITION TRANSFORMER

(71) Applicant: Toyota Motor Engineering & Manufacturing North America, Inc., Plano, TX (US)

(72) Inventors: Chianing Wang, Mountain View, CA (US); Ba Khai Nguyen, Austin, TX (US); Alexander T. Pham, San Jose, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 130 days.

(21) Appl. No.: 18/524,507

(22) Filed: Nov. 30, 2023

(65) Prior Publication Data

US 2025/0182542 A1 Jun. 5, 2025

(51) Int. Cl.
*G07C 5/08* (2006.01)
*G07C 5/04* (2006.01)

(52) U.S. Cl.
CPC ............. *G07C 5/0825* (2013.01); *G07C 5/04* (2013.01)

(58) Field of Classification Search
CPC ................................ G07C 5/0825; G07C 5/04
See application file for complete search history.

(56) References Cited

U.S. PATENT DOCUMENTS

| | | | | |
|---|---|---|---|---|
| 11,527,786 B1* | 12/2022 | Budan | ........................ | B60L 3/12 |
| 2009/0278489 A1* | 11/2009 | St-Jacques | ............ | H02J 7/0016 320/103 |
| 2024/0178501 A1* | 5/2024 | Kim | .................... | H01M 50/204 |

FOREIGN PATENT DOCUMENTS

| | | | |
|---|---|---|---|
| CN | 116432528 | A | 7/2023 |
| CN | 116593917 | A | 8/2023 |

OTHER PUBLICATIONS

Wu et al. "Remaining Useful Life Prediction of Lithium-Ion Batteries Using Neural Network and Bat-Based Particle Filter", IEEE Access, vol. 7. 2019.

(Continued)

*Primary Examiner* — Behrang Badii
(74) *Attorney, Agent, or Firm* — Christopher G. Darrow; Darrow Mustafa PC

(57) ABSTRACT

Systems and methods described herein relate to implementing battery life prediction strategies. In one embodiment, a method includes receiving a first battery dataset containing a first set of battery entries, a first set of historical usage entries, a first set of local parts entries, and a first global parts entry; generating a second battery dataset containing a second set of battery entries and a second set of historical usage entries; generating a second set of local parts entries for the second battery dataset based on comparing the first set of historical usage entries with the second set of historical usage entries; copying the first global parts entry to a second global parts entry of the second battery dataset; and optimizing via one or more global local decomposition transformers the second set of local parts entries and the second global parts entry based on the second set of historical usage entries.

20 Claims, 9 Drawing Sheets

(56) References Cited

OTHER PUBLICATIONS

Zhang et al. "Long short-term memory recurrent neural network for remaining useful life prediction of lithium-ion batteries", IEEE Transactions on Vehicular Technology 67.7. 2018. NPL Needed.
Chen et al. "Transformer Network for Remaining Useful Life Prediction of Lithium-Ion Batteries", IEEE Access, vol. 10. 2022.
Wikipedia. "Dynamic time warping", Retrieved from the Internet: <https://en.wikipedia.org/wiki/Dynamic_time_warping>, retrieved Nov. 15, 2023.
Wikipedia. "Transportation theory (mathematics)", Retrieved from the Internet: <https://en.wikipedia.org/wiki/Transportation_theory_(mathematics)>, retrieved Nov. 15, 2023.
He et al. "Prognostics of lithium-ion batteries based on Dempster—Shafer theory and the Bayesian Monte Carlo method", Journal of Power Sources, vol. 196, issue 23. 2011.
Zhang et al. "Deep Learning in the State of Charge Estimation for Li-Ion Batteries of Electric Vehicles: A Review", Machines 10, No. 10. 2022.
Samanta et al. "Machine Learning-based Remaining Useful Life Prediction Techniques for Lithium-ion Battery Management Systems: A Comprehensive Review", IEEJ Journal of Industry Applications. 2023.
Ramezani et al. "Scalability, Explainability and Performance of Data-Driven Algorithms in Predicting the Remaining Useful Life: A Comprehensive Review", TechRxiv. 2023.

* cited by examiner

BATTERY LIFE PREDICTION USING A GLOBAL-LOCAL DECOMPOSITION TRANSFORMER

TECHNICAL FIELD

The subject matter described herein relates, in general, to strategies for predicting battery life, and, more particularly, to predicting battery life using a global-local decomposition transformer.

BACKGROUND

Offering light weight, high-energy density, good performance and a long lifetime, rechargeable Lithium-ion (Li-ion) batteries are a popular choice for electric vehicle platforms. However, as the charge-discharge cycle increases, capacity of such batteries generally degrades until they can no longer support satisfactory vehicle operation. Current approaches for predicting future capacity often require knowing a physical configuration of both the vehicle and its rechargeable batteries, which may be inaccurate under uncertain environmental conditions or too costly to implement.

SUMMARY

In one embodiment, a battery life prediction system is disclosed. The vehicle management system includes one or more processors and a memory communicably coupled to the one or more processors. The memory stores a command module including instructions that when executed by the one or more processors cause the one or more processors to receive a first battery dataset containing a first set of battery entries, a first set of historical usage entries, a first set of local parts entries, and a first global parts entry; generate a second battery dataset containing a second set of battery entries and a second set of historical usage entries; generate a second set of local parts entries for the second battery dataset based on comparing the first set of historical usage entries with the second set of historical usage entries; copy the first global parts entry to a second global parts entry of the second battery dataset; and optimize via one or more global local decomposition transformers the second set of local parts entries and the second global parts entry based on the second set of historical usage entries.

In one embodiment, a non-transitory computer-readable medium including instructions that when executed by one or more processors cause the one or more processors to perform one or more functions is disclosed. The instructions include instructions to receive a first battery dataset containing a first set of battery entries, a first set of historical usage entries, a first set of local parts entries, and a first global parts entry; generate a second battery dataset containing a second set of battery entries and a second set of historical usage entries; generate a second set of local parts entries for the second battery dataset based on comparing the first set of historical usage entries with the second set of historical usage entries; copy the first global parts entry to a second global parts entry of the second battery dataset; and optimize via one or more global local decomposition transformers the second set of local parts entries and the second global parts entry based on the second set of historical usage entries.

In one embodiment, a method for implementing battery life prediction strategies is disclosed. In one embodiment, the method includes receiving a first battery dataset containing a first set of battery entries, a first set of historical usage entries, a first set of local parts entries, and a first global parts entry; generating a second battery dataset containing a second set of battery entries and a second set of historical usage entries; generating a second set of local parts entries for the second battery dataset based on comparing the first set of historical usage entries with the second set of historical usage entries; copying the first global parts entry to a second global parts entry of the second battery dataset; and optimizing via one or more global local decomposition transformers the second set of local parts entries and the second global parts entry based on the second set of historical usage entries.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with battery life prediction are described herein. With respect to battery life prediction, remaining useful life (RUL) prediction is a widely used method. RUL prediction is estimating the number of charge-discharge cycles left before a battery's maximum capacity degrades below a certain threshold (e.g., 80%). Physics-based approaches to RUL prediction, where mathematical models describing physical properties are utilized, are in practice difficult to make accurate when a battery is operating in noisy uncontrolled environments. Data-driven approaches to RUL prediction, which use deep learning models analyzing historical data, are more flexible and easier to operate, but have to be trained for each battery they analyze.

Accordingly, an approach is described herein for battery life prediction, such as RUL prediction, that may utilize a deep learning model capable of reusing information between batteries to enable faster training, better accuracy, or both. For example, a transformer for estimating battery life may be decomposed into: (a) local parts, comprised of encoding, decoding, and transformer layers corresponding to information unique to an individual battery within a battery set; and (b) global parts, comprised of encoding, decoding, and transformer layers corresponding common information between the batteries within a battery set. Based on this approach, when new batteries are presented to the system, the global part and local parts may be copied over in a manner to a transformer as described herein, such that the transformer may be better able to represent the new batteries before optimization, thereby accelerating training. In addition, the finetuning of such a transformer may yield more accurate estimates of battery life in terms of shorter training time as compared to a traditional transformer without decomposition.

Figure 1:
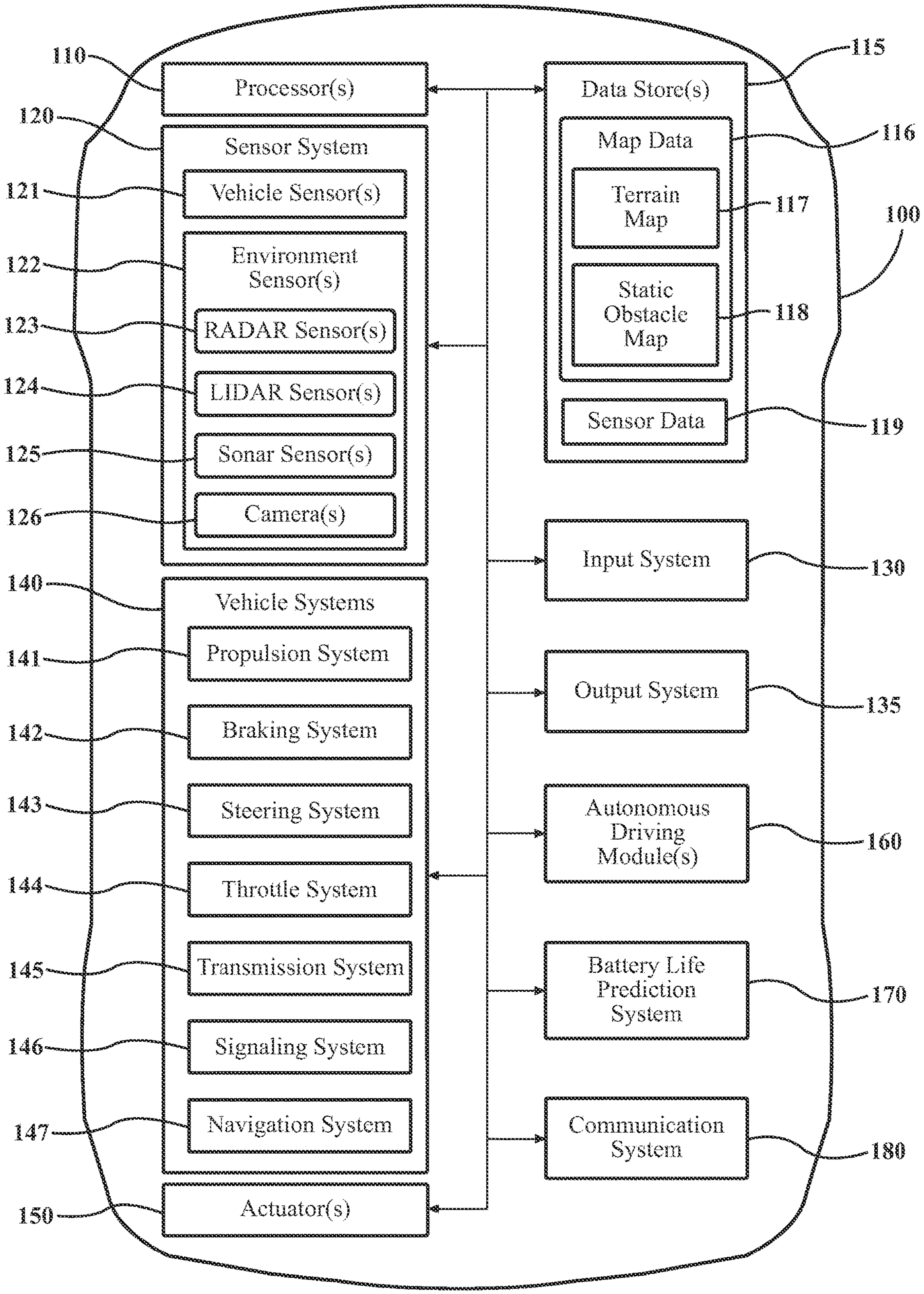
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, vehicle 100 is an automobile. While arrangements will be described herein with respect to automobiles, it will be understood that embodiments are not limited to automobiles. In some implementations, vehicle 100 may be any robotic device or form of motorized transport that, for example, includes sensors to perceive aspects of the surrounding environment, and thus benefits from the functionality discussed herein associated battery life prediction strategies. As a further note, this disclosure generally discusses vehicle 100 as traveling on a roadway with surrounding vehicles, which are intended to be construed in a similar manner as vehicle 100 itself. That is, the surrounding vehicles may include any vehicle that may be encountered on a roadway by vehicle 100.

Vehicle 100 also includes various elements. It will be understood that in various embodiments it may not be necessary for vehicle 100 to have all of the elements shown in FIG. 1. Vehicle 100 may have any combination of the various elements shown in FIG. 1. Further, vehicle 100 may have additional elements to those shown in FIG. 1. In some arrangements, vehicle 100 may be implemented without one or more of the elements shown in FIG. 1. While the various elements are shown as being located within vehicle 100 in FIG. 1, it will be understood that one or more of these elements may be located external to vehicle 100. Further, the elements shown may be physically separated by large distances. For example, as discussed, one or more components of the disclosed system may be implemented within a vehicle while further components of the system are implemented within a cloud-computing environment or other system that is remote from vehicle 100.

Some of the possible elements of vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, vehicle 100 includes a battery life prediction system 170 that is implemented to perform methods and other functions as disclosed herein relating to implementing battery life prediction strategies. As will be discussed in greater detail subsequently, battery life prediction system 170, in various embodiments, is implemented partially within vehicle 100 and as a cloud-based service. For example, in one approach, functionality associated with at least one module of battery life prediction system 170 is implemented within vehicle 100 while further functionality is implemented within a cloud-based computing system.

Figure 2:
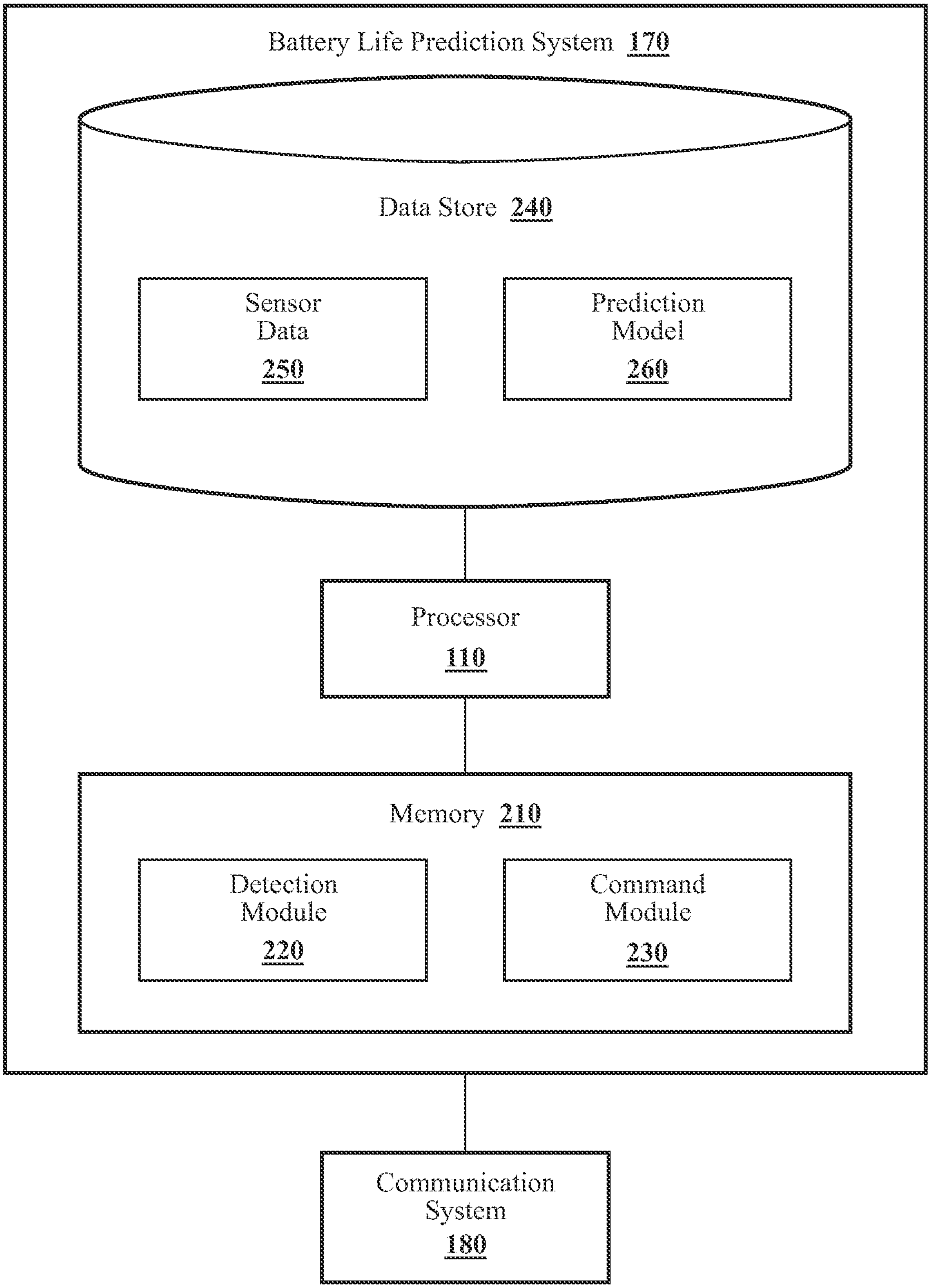
FIG. 2 illustrates one embodiment of a battery life prediction system that is associated with implementing battery life prediction strategies.

With reference to FIG. 2, one embodiment of battery life prediction system 170 of FIG. 1 is further illustrated. Battery life prediction system 170 is shown as including processor(s) 110 from vehicle 100 of FIG. 1. Accordingly, processor(s) 110 may be a part of battery life prediction system 170, battery life prediction system 170 may include a separate processor from processor 110(*s*) of vehicle 100, or battery life prediction system 170 may access processor 110(*s*) through a data bus or another communication path. In one embodiment, battery life prediction system 170 includes memory 210, which stores detection module 220 and command module 230. Memory 210 is a random-access memory (RAM), read-only memory (ROM), a hard-disk drive, a flash memory, or other suitable memory for storing detection module 220 and command module 230. Detection module 220 and command module 230 are, for example, computer-readable instructions that when executed by processor(s) 110 cause processor(s) 110 to perform the various functions disclosed herein.

Battery life prediction system 170 as illustrated in FIG. 2 is generally an abstracted form of battery life prediction system 170 as may be implemented between vehicle 100 and a cloud-computing environment. Accordingly, battery life prediction system 170 may be embodied at least in part within a cloud-computing environment to perform the methods described herein.

With reference to FIG. 2, detection module 220 generally includes instructions that function to control processor(s) 110 to receive data inputs from one or more sensors of vehicle 100. The inputs are, in one embodiment, observations of one or more objects in an environment proximate to vehicle 100, other aspects about the surroundings, or both. As provided for herein, detection module 220, in one embodiment, acquires sensor data 250 that includes at least camera images. In further arrangements, detection module 220 acquires sensor data 250 from further sensors such as radar 123, LiDAR 124, and other sensors as may be suitable for identifying vehicles, locations of the vehicles, lane markers, crosswalks, traffic signs, vehicle parking areas, road surface types, curbs, vehicle barriers, and so on. In one embodiment, detection module 220 may also acquire sensor data 250 from one or more sensors that allow for implementing battery life prediction strategies.

Accordingly, detection module 220, in one embodiment, controls the respective sensors to provide sensor data 250. Additionally, while detection module 220 is discussed as controlling the various sensors to provide sensor data 250, in one or more embodiments, detection module 220 may employ other techniques to acquire sensor data 250 that are either active or passive. For example, detection module 220 may passively sniff sensor data 250 from a stream of electronic information provided by the various sensors to further components within vehicle 100. Moreover, detection module 220 may undertake various approaches to fuse data from multiple sensors when providing sensor data 250, from sensor data acquired over a wireless communication link (e.g., v2v) from one or more of the surrounding vehicles, or from a combination thereof. Thus, sensor data 250, in one embodiment, represents a combination of perceptions acquired from multiple sensors.

In addition to locations of surrounding vehicles, sensor data 250 may also include, for example, odometry information, GPS data, or other location data. Moreover, detection module 220, in one embodiment, controls the sensors to acquire sensor data about an area that encompasses 360 degrees about vehicle 100, which may then be stored in sensor data 250. In some embodiments, such area sensor data may be used to provide a comprehensive assessment of the surrounding environment around vehicle 100. Of course, in alternative embodiments, detection module 220 may acquire the sensor data about a forward direction alone when, for example, vehicle 100 is not equipped with further sensors to include additional regions about the vehicle or the additional regions are not scanned due to other reasons (e.g., unnecessary due to known current conditions).

Moreover, in one embodiment, battery life prediction system 170 includes a database 240. Database 240 is, in one embodiment, an electronic data structure stored in memory 210 or another data store and that is configured with routines that may be executed by processor(s) 110 for analyzing stored data, providing stored data, organizing stored data, and so on. Thus, in one embodiment, database 240 stores data used by the detection module 220 and command module 230 in executing various functions. In one embodiment, database 240 includes sensor data 250 along with, for example, metadata that characterize various aspects of sensor data 250. For example, the metadata may include location coordinates (e.g., longitude and latitude), relative map coordinates or tile identifiers, time/date stamps from when separate sensor data 250 was generated, and so on.

Detection module 220, in one embodiment, is further configured to perform additional tasks beyond controlling the respective sensors to acquire and provide sensor data 250. For example, detection module 220 includes instructions that may cause processor(s) 110 to form battery datasets for one or more rechargeable batteries. For example, detection module 220 may include in a battery dataset historical usage information regarding one or more rechargeable batteries within vehicle 100. Such historical usage information may be comprised of data regarding charging capacities relative to the number of charge/discharge cycles, continuous full and partial cycling, storage capacities, dynamic driving profiles, open circuit voltage measurements, impedance measurements, form factors, chemistries, or other data useful for battery life prediction. In some embodiments, detection module 220 may receive battery datasets regarding one or more reference batteries. In some embodiments, detection module 220 may generate or receive multiple battery datasets, such as a first battery dataset (e.g., a reference dataset) and a second battery dataset (e.g., an installation dataset). In addition to the historical usage information, a battery dataset may also contain local parts and global parts for use with a GLD transformer as further discussed below.

Figure 3:
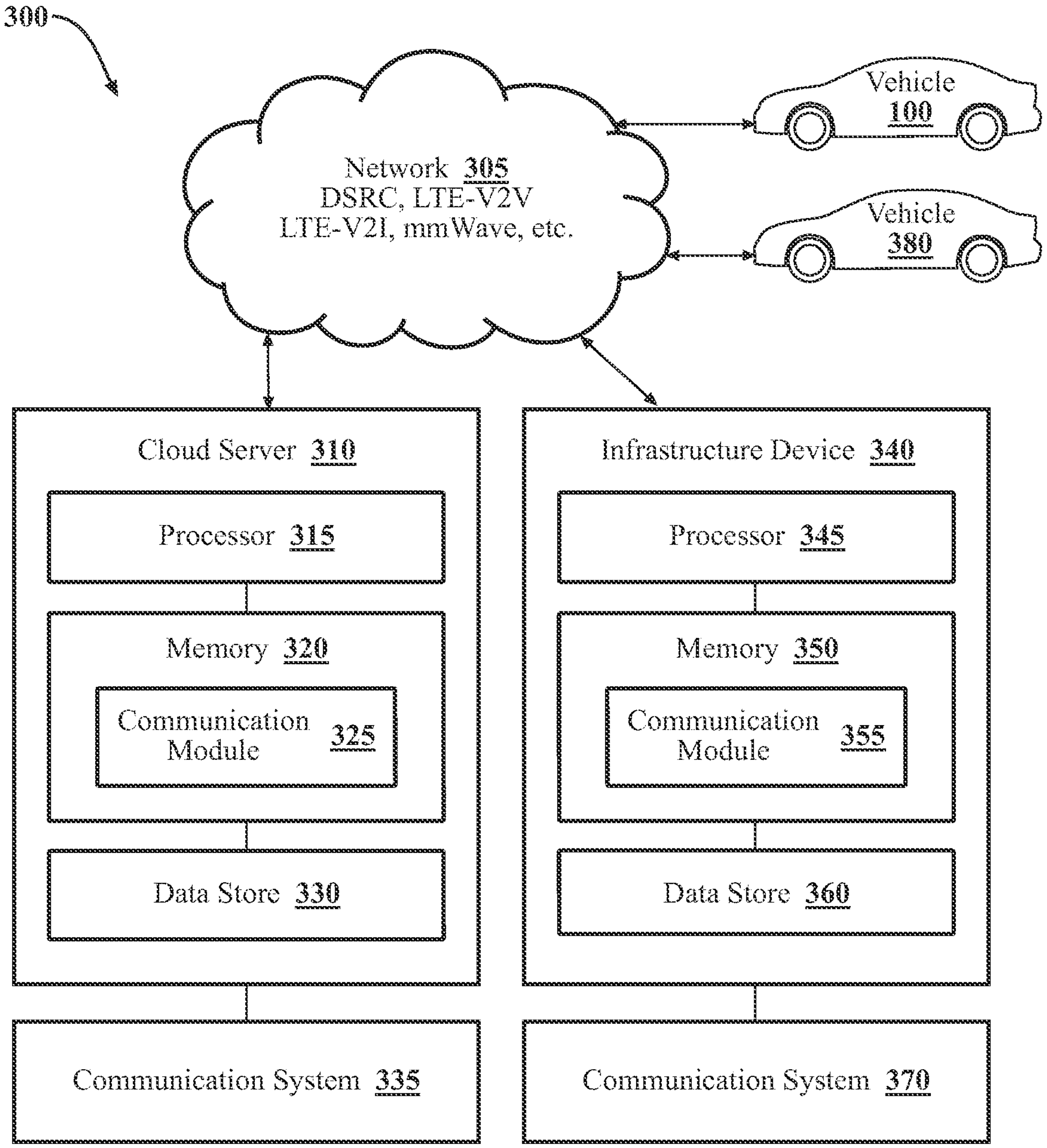
FIG. 3 illustrates one embodiment of a cloud computing environment within which the systems and methods described herein may operate.

In one embodiment, command module 230 generally includes instructions that function to control the processor(s) 110 or collection of processors in the cloud-computing environment 300 as shown in FIG. 3 for implementing battery life prediction strategies.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305. With respect to network 305, such a network may use any form of communication or networking to exchange data, including but not limited to the Internet, Directed Short Range Communication (DSRC) service, LTE, 5G, millimeter wave (mmWave) communications, and so on.

Cloud server 310 is shown as including a processor 315 that may be a part of battery life prediction system 170 through network 305 via communication unit 335. In one embodiment, cloud server 310 includes a memory 320 that stores a communication module 325. Memory 320 is a random-access memory (RAM), read-only memory (ROM), a hard-disk drive, a flash memory, or other suitable memory for storing communication module 325. Communication module 325 is, for example, computer-readable instructions that when executed by processor 315 causes processor 315 to perform the various functions disclosed herein. Moreover, in one embodiment, cloud server 310 includes database 330. Database 330 is, in one embodiment, an electronic data structure stored in a memory 320 or another data store and that is configured with routines that may be executed by processor 315 for analyzing stored data, providing stored data, organizing stored data, and so on.

Infrastructure device 340 is shown as including a processor 345 that may be a part of battery life prediction system 170 through network 305 via communication unit 370. In one embodiment, infrastructure device 340 includes a memory 350 that stores a communication module 355. Memory 350 is a random-access memory (RAM), read-only memory (ROM), a hard-disk drive, a flash memory, or other suitable memory for storing communication module 355. Communication module 355 is, for example, computer-readable instructions that when executed by processor 345 causes processor 345 to perform the various functions disclosed herein. Moreover, in one embodiment, infrastructure device 340 includes a database 360. Database 360 is, in one embodiment, an electronic data structure stored in memory 350 or another data store and that is configured with routines that may be executed by processor 345 for analyzing stored data, providing stored data, organizing stored data, and so on.

Accordingly, in addition to information obtained from sensor data 250, battery life prediction system 170 may obtain information from cloud servers (e.g., cloud server 310), infrastructure devices (e.g., infrastructure device 340), other vehicles (e.g., vehicle 380), and any other systems connected to network 305. For example, cloud servers (e.g., cloud server 310) may be used to perform the same tasks as described herein with respect to command module 230. For instance, a battery dataset may be collected by vehicle 100 and sent to cloud server 310, where the battery dataset may be used with a global-local decomposition transformer as described herein.

In some embodiments, command module 230 may receive a one or more battery datasets (e.g., via sensor data 250).

Figure 4A:
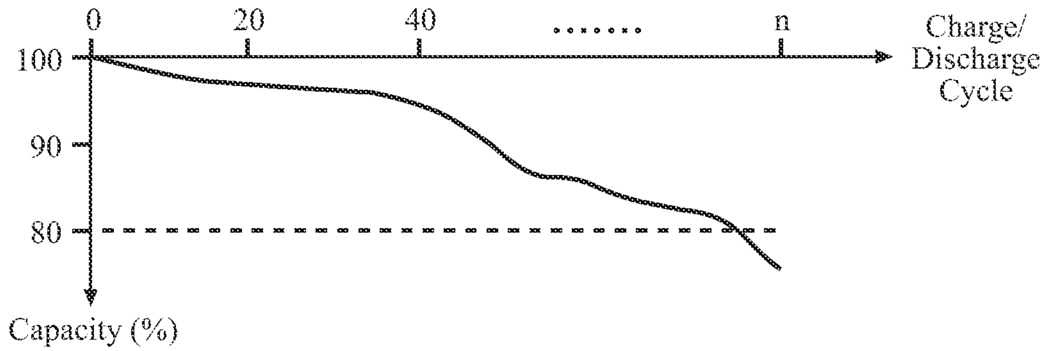
FIG. 4A illustrates one example of a graph showing charging capacity vs. number of charge/discharge cycles for a battery.
Figure 4B:
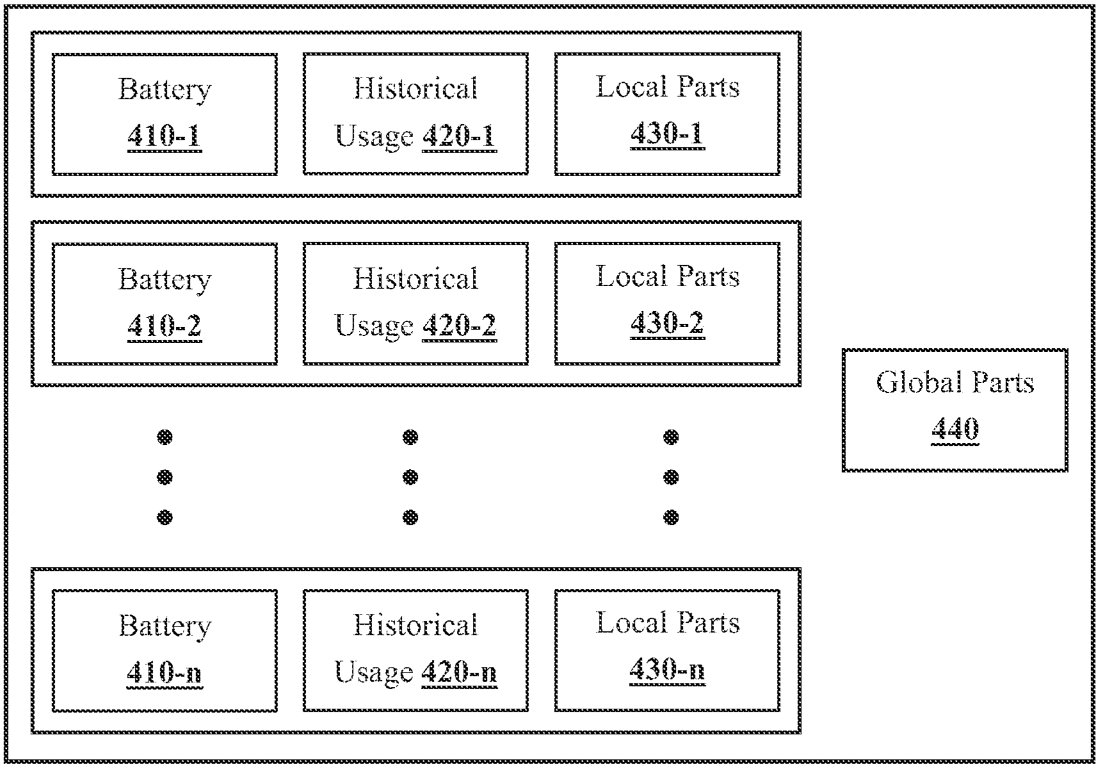
FIG. 4B illustrates one example of a battery dataset.

An example of a battery dataset 400 is shown in FIG. 4A, which may contain one or more battery entries (e.g., battery 410-1, battery 410-2, . . . , battery **410-*n*) as shown. Each battery entry may have a corresponding historical usage entry and a local parts entry. For example, historical usage 420-1 and local parts 430-1** may correspond to battery 410-1, historical usage 420-2 and local parts 430-2 may correspond to battery 410-2, and so on. A historical usage entry contains historical usage information for the battery associated with the entry. For example, historical usage information may contain the battery's charging capacity relative to the number of charge/discharge cycles as shown in FIG. 4B. A local parts entry may contain any information (e.g., weights), necessary to configure the local encoder layers, local decoder layers, local transformer layers, or local predictive layer of a GLD transformer as described below. Battery dataset 400 may also contain a global parts entry (e.g., global parts 440) that may contain any information (e.g., weights), necessary to configure the global encoder layers, global decoder layers, global transformer layers, or global predictive layer of a GLD transformer as described below. In some embodiments, battery dataset may also contain other information, such as values of p and q for configuring/constructing a GLD transformer (as described below); unique identifiers for each battery; rated capacities or other manufacturer specifications; information regarding a vehicle or device associated with the battery dataset (e.g., environmental history, geographic location); and so on.

Figure 5:
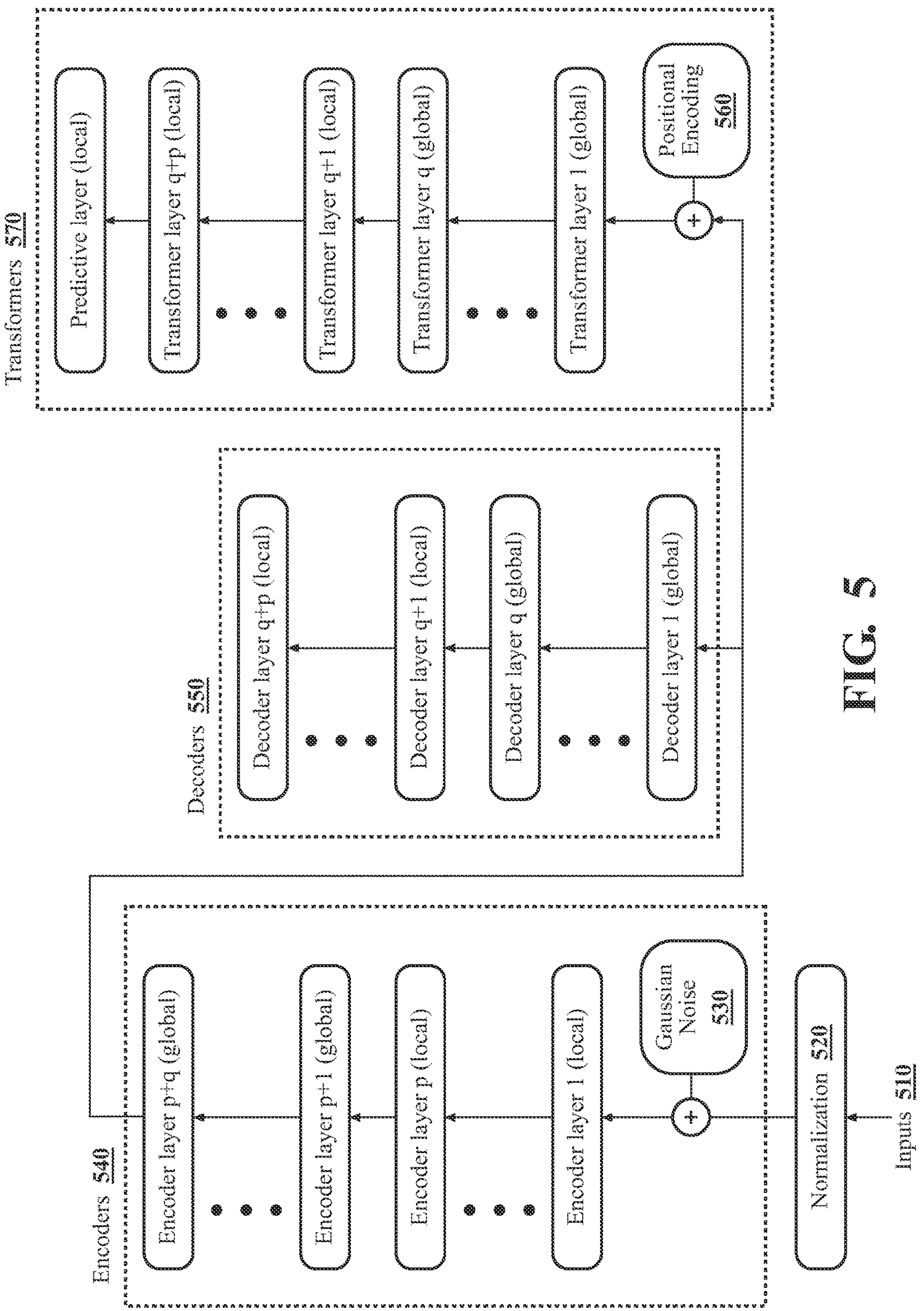
FIG. 5 illustrate one example of a global local decomposition transformer.

In some embodiments, command module 230 may construct a global-local decomposition ("GLD") transformer 500 as shown in FIG. 5 for receiving inputs 510. GLD transformer 500 may be comprised of normalization 520, encoders module 540 (including noise source 530), decoders module 550, and transformers module 570 (including positional encoding 560). Within GLD transformer 500, encoders module 540 may have p local encoder layers and q global encoder layers; decoder module 550 may have p local decoder layers and q global decoder layers; and transformer module 570 may have p local transformer layers, q global transformer layers, and a local predictive layer. With respect to GLD transformer 500, adjusting the values of p can be seen as allowing GLD transformer 500 the ability to analyze different levels of complexity with respect to an individual battery's unique characterization of its historical usage. Similarly, adjusting the values of q can be seen as allowing GLD transformer 500 the ability to analyze different levels of complexity with respect to shared aspects of historical usage across the battery set. For example, where the historical usages within a battery dataset is highly similar, a low value of p may be sufficient whereas a higher value of q may be required. Similarly, where the historical usages within a battery dataset is highly dissimilar, a low value of q may be sufficient whereas a higher value of p may be required.

In some embodiments, battery dataset 400 may contain configuration data in both the local parts entries and a global parts entry for GLD transformer 500. If such configuration data is present, then command module 230 may configure GLD transformer 500 with respect to a particular battery entry. For example, if GLD transformer 500 should be configured for battery 410-2, then information from local parts 430-2 (e.g., weights) may be used by command module 230 to configure the local encoder layers, local decoder layers, local transformer layers, and local predictive layer of GLD transformer 500; and information from global parts 440 (e.g., weights) may be used by command module 230 to configure the global encoder layers, global decoder layers, global transformer layers of GLD transformer 500. Similarly, if the configuration of GLD transformer 500 changes (e.g., weights are updated), then such changes may be saved by command module 230 to the appropriate local parts entry or global parts entry of the battery entry to which GLD transformer 500 was configured.

With respect to the operation of GLD transformer 500 by command module 230, the process begins with input 510, which may receive an input sequence comprising historical usage information. For example, the input sequence may be data representing the charging capacity relative to the number of charge/discharge cycles within the historical usage entry (e.g., historical usage 420-1) associated with a particular battery within a battery dataset (e.g., battery 410-1), such that:

$$x = \{x_1, x_2, \ldots, x_n\}, \quad \text{Equation (1)}$$

where $x_t$ is the t-th capacity of x.

In order to reduce the influence of input data distribution changes, the input sequence x may be processed by normalization module 520 as follows:

$$x' = (x/C_0), \quad \text{Equation (2)}$$

where x denotes the input sequence described above and $C_0$ denotes the rated capacity of the battery.

After normalization, a Denoising Auto-Encoder (DAE) may be used to denoise the normalized input sequence x' as shown in FIG. 5. The DAE may be comprised of noise source 530; encoders module 540; and decoders module 550. Noise source 530 may apply a gaussian noise source, such that:

$$\tilde{x}_t = x' + N(0, \sigma^2 I), \quad \text{Equation (3)}$$

where σ may denote a small constant (e.g., smaller than 0.5) and I may denote an identity matrix.

The output of the DAE may be given by:

$$z = a(W^T \tilde{x}_t + b), \quad \text{Equation (4)}$$

where W, b, a(·), and z may denote the weight, bias, activation function, and output of the DAE, respectively. With respect to activation functions within the DAE, the encoder layers of encoders module 540 may use a Rectified Linear Unit (ReLU) activation function, while the decoder layers of decoders module 550 may use an identity activation function.

Based on the output of the DAE, a reconstructed input sequence may be given by:

$$\hat{x}_t = f'(W'z + b'), \quad \text{Equation (5)}$$

where W', b', and f'(·) may denote the weight, bias, and map function of the output layer of the DAE, respectively.

In addition, GLD transformer 500 may use transformers module 570 to extract the capacity degradation features from the historical usage information. Prior to the transformer layers within transformers module 570, GLD transformer 500 may use positional encoding 560 to inject relative position tokens into an output sequence received from encoders module 540. For example, positional encoding 560 may use sine and cosine functions of different frequencies as follows:

$$PE(t, 2k) = \sin\left(\frac{t}{10000^{\frac{2k}{m}}}\right), \quad \text{Equation (6)}$$

$$PE(t, 2k+1) = \cos\left(\frac{t}{10000^{\frac{2k}{m}}}\right), \quad \text{Equation (7)}$$

where t denotes the time step.

Figure 6:
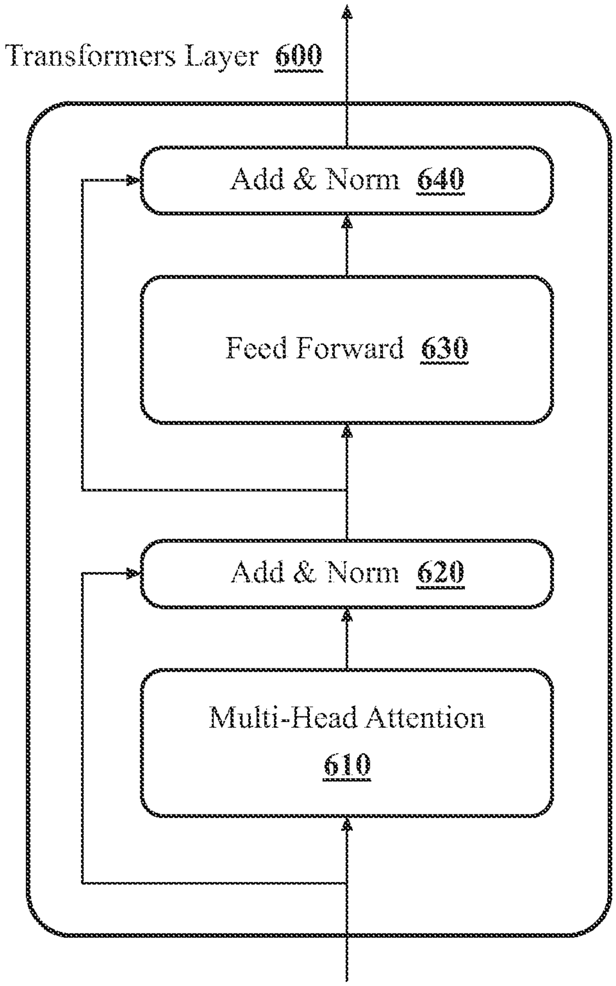
FIG. 6 illustrate one example of a transformer layer.

The output after positional encoding module 560 may then by processed by q global transformer layers, followed by p local transformer layers. An example of a transformer layer 600 is shown in FIG. 6, which may be used as a global or local transformer layer as described herein. Transformer layer 600 may receive an input that is fed to: (i) multi-head attention layer 610; and (ii) add & norm layer 620. Add & norm layer 620 may also receive the output of multi-head attention layer 610, add it to the input to transformer layer 600, and then normalize the result. For example, add & norm layer 620 may use the function LayerNorm(k+Sublayer(k)), where k is the input to transformer layer 600 and Sublayer(k) is the output of multi-head attention layer 610.

The output of add & norm layer 620 may then be fed to: (i) feed forward layer 630; and (ii) add & norm 640 layer. Add & norm layer 640 may also receive the output of feed forward layer 630, add it to the output of add & norm layer 620, and then normalize the result to produce the output of transformer layer 600. For example, add & norm 640 layer may also use the function LayerNorm(k+Sublayer(k)), except k is the output from add & norm layer 620 and Sublayer(k) is the output of feed forward layer 630.

Finally, a predictive layer (local) of transformers module 570 may be used to map the representation learned by the last transformer layer of transformers module 570 to arrive at the final prediction $\hat{x}_t$.

Figure 7:
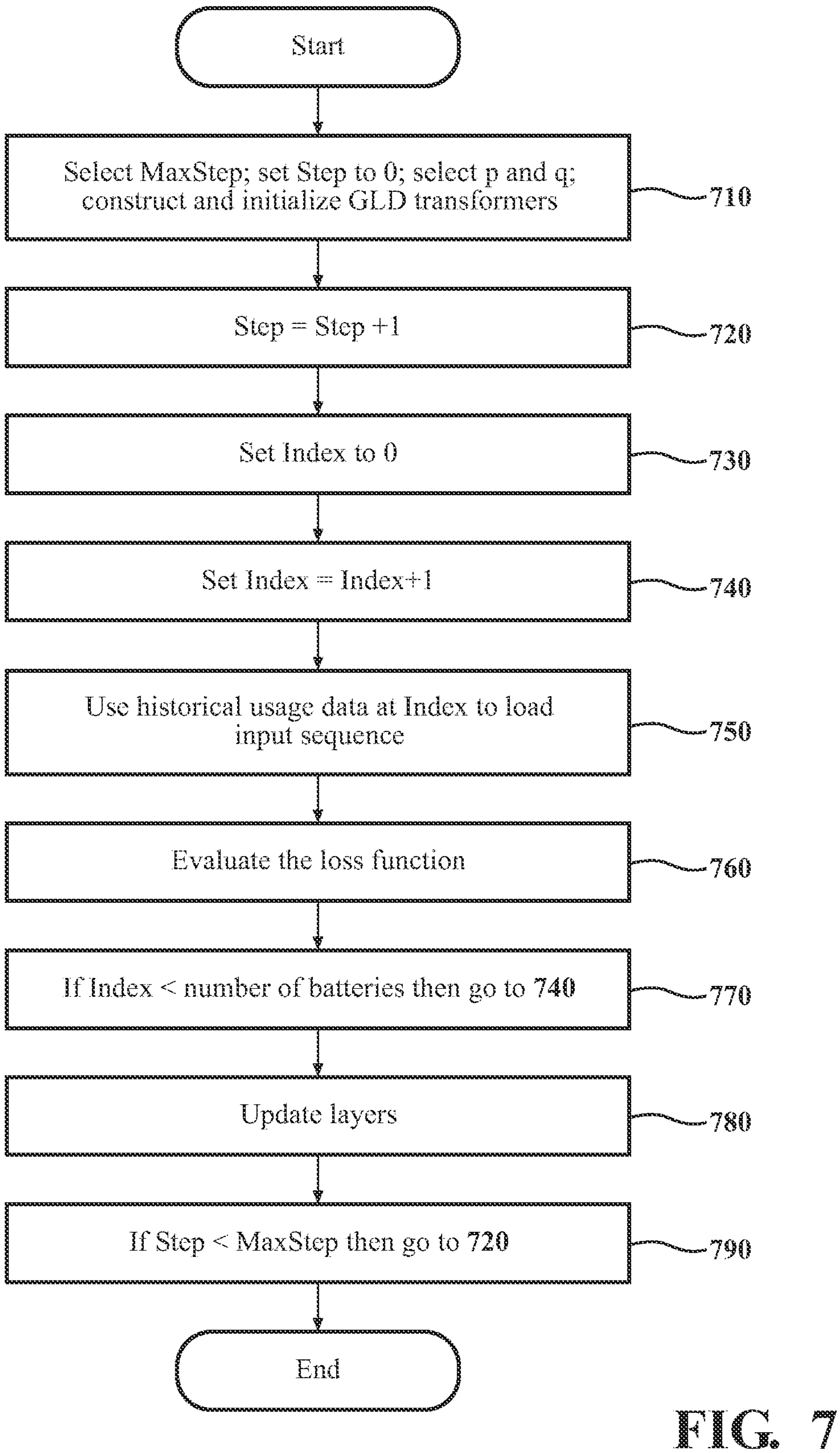
FIG. 7 illustrate one example of a method for initializing one or more global local decomposition transformers.

FIG. 7 illustrates a flowchart of a method 700 that is associated with initializing one or more GLD transformers, such as where the local parts entries and global parts entry of a battery set do not have configuration data. Method 700 will be discussed from the perspective of the battery life prediction system 170 of FIGS. 1 and 2. While method 700 is discussed in combination with the battery life prediction system 170, it should be appreciated that the method 700 is not limited to being implemented within battery life prediction system 170 but is instead one example of a system that may implement method 700.

At 710, command module 230 may receive a first battery dataset; select or receive a value for a variable MaxStep; set a variable Step equal to 0; and select values for p and q (e.g., as specified by the first battery dataset).

In addition, command module 230 may construct a GLD transformer for each battery within the first battery dataset (e.g., GLD transformer 700-1, GLD transformer 700-2, . . . , GLD transformer 700-*n*), in which each GLD transformer for each battery has unique layers with respect to the local layers, but the global layers across all the GLD transformers share the same data or layers (e.g., there is only one set of global layers used by all the GLD transformers).

Once the GLD transformers are constructed, command module 230 may initialize the local encoder layers, local decoder layers, and local transformer layers of all the GLD transformers with random values; and initialize the global encoder layers, global decoder layers, and global transformer layers shared by the GLD transformers with random values.

At 720, command module 230 may increment the variable Step by 1.

At 730, command module 230 may set a variable Index equal to 0.

At 740, command module 230 may increment the variable Index by 1.

At 750, command module 230 may use the historical usage data (e.g., charging capacity relative to the number of charge/discharge cycles) associated with a battery at the value of Index within the first battery dataset (e.g., historical usage 420-1) as an input sequence for GLD transformer associated with the battery at the value of Index within the first battery dataset (e.g., GLD transformer 700-1).

At 760, command module 230 may evaluate (e.g., via an Adam optimizer or equivalent) for one iteration the GLD transformer associated with the battery at the value of Index within the first battery dataset (e.g., GLD transformer 700-1) with respect to the following loss function:

$$\mathcal{L} = \sum_{t=T+1}^{n} (x_t - \hat{x}_t)^2 + \alpha \sum_{i=1}^{n} \ell(\tilde{x}_i - \hat{x}_i) + \lambda\Omega(\Theta), \quad \text{Equation (8)}$$

where T may denote the length of samples generated from a sequence for training, $x_t$ may denote the t-th capacity, $\hat{x}_t$ may denote the predicted value of $x_t$, $\alpha$ may denote a parameter to control the relative contribution of each task, $\ell$ may denote a loss function, $\tilde{x}_i$ may denote the corrupted vector of $x_i$, $\hat{x}_i$ may denote the predicted value of $x_i$, $\lambda$ may denote a regularization parameter, $\Omega(\cdot)$ may denote the regularization, and $\Theta$ may denote the learning parameters of the model.

Once command module 230 determines the parameter update with respect to the GLD transformer associated with the battery at the value of Index within the first battery dataset (e.g., GLD transformer 700-1), the parameter update is temporarily saved in a table of parameter update values (e.g., parameter_update(1, . . . , n)).

At 770, if the value of Index is less than the number of batteries within the first battery dataset, then command module 230 may return to step 740.

At 780, command module 230 may update the local encoder layers, local decoder layers, and local transformer layers of each GLD transformer based on the local portion of the parameter update associated with the same battery. In addition, the command module 230 may update the global encoder layers, global decoder layers, and global transformer layers shared between the GLD transformers based on averaging the global portions of all the parameter updates stored in the table of parameter update values.

At 790, if the value of Step is less than MaxStep, then command module 230 may return to step 720.

Figure 8:
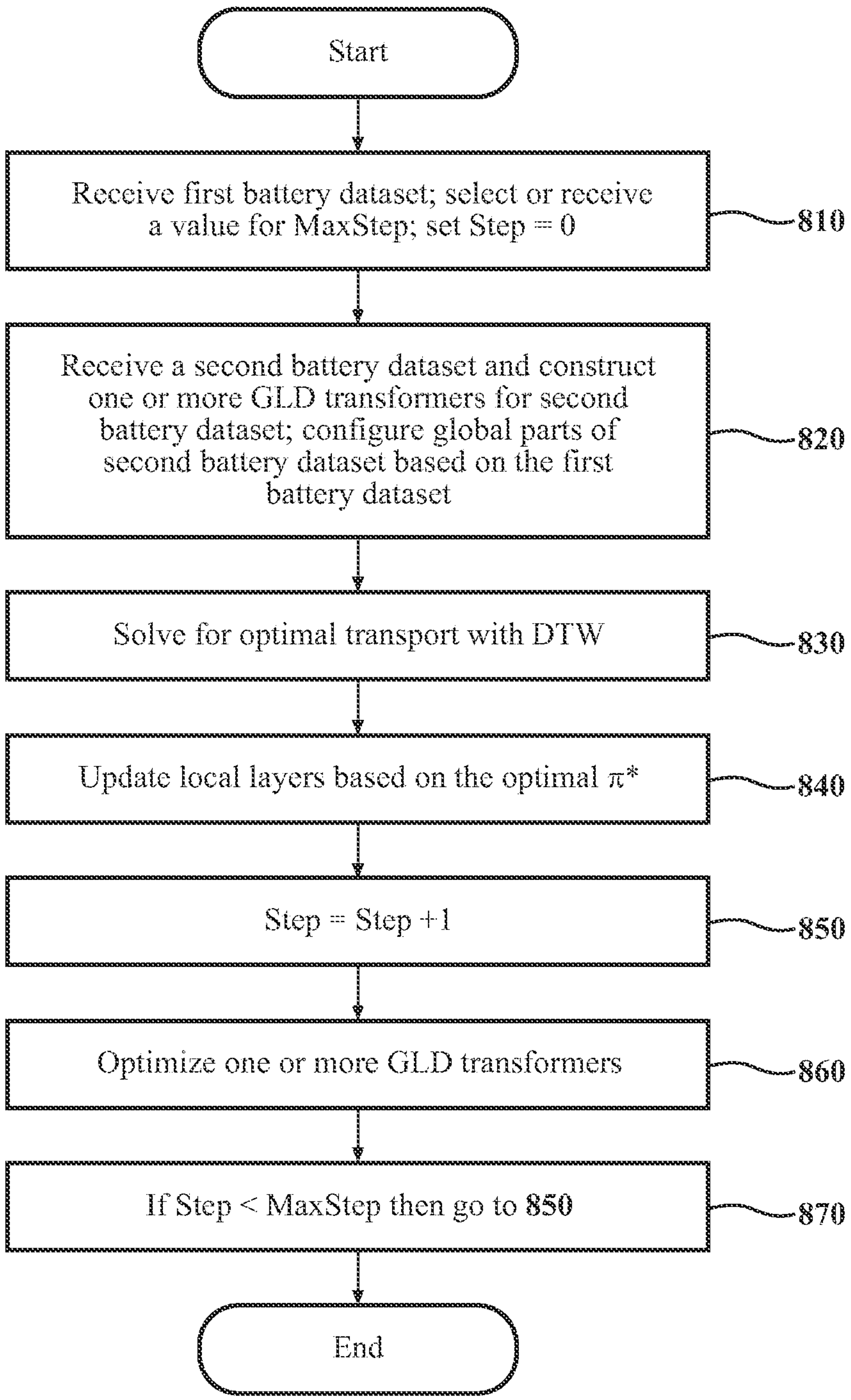
FIG. 8 illustrate one example of a method for training and finetuning one or more global local decomposition transformers for a second battery dataset based on a first battery dataset.

FIG. 8 illustrates a flowchart of a method 800 that is associated with using a first set of GLD transformers associated with a first battery dataset to train and finetune a second set of GLD transformers associated with a second battery dataset. Method 800 will be discussed from the perspective of the battery life prediction system 170 of FIGS. 1 and 2. While method 800 is discussed in combination with the battery life prediction system 170, it should be appreciated that the method 800 is not limited to being implemented within battery life prediction system 170 but is instead one example of a system that may implement method 800.

At 810, command module 230 may receive a first battery dataset; select or receive a value for MaxStep; and set the variable Step equal to 0.

At 820, command module 230 receive a second battery dataset. In addition, command module 230 may construct a GLD transformer for each battery within the second battery dataset (e.g., GLD transformer 800-1, GLD transformer 800-2, . . . , GLD transformer 800-*n*), in which each GLD transformer for each battery has unique layers with respect to the local layers, but the global layers across all the GLD transformers share the same data or layers (e.g., there is only one set of global layers used by all the GLD transformers).

Once the GLD transformers are created, the global parts may be configured based on the global parts entry of the first battery dataset (e.g., by copying the global parts entry from the first battery dataset to the second battery dataset).

At 830, command module 230 may solve for optimal transport with Dynamic Time Warping ("DTW") between the batteries in the two datasets using the following equation:

$$\min_{\pi \in \left\{\mathbb{R}_{+}^{n \times m} \mid \pi 1 = \frac{1}{n}, \pi^{\top} 1 = 1/m\right\}} \sum_{i=1}^{n} \sum_{j=1}^{m} \pi_{ij} DTW(A_i, B_j), \qquad \text{Equation (9)}$$

where n may denote the number of batteries in the first battery dataset, m may denote the number of batteries in the second battery dataset, $\pi_{ij}$ may denote a probability value within the matrix $\pi$ at position (i,j), DTW(·) may denote a dynamic time warping ground metric, $A_i$ may denote the i-th training dataset of the first battery dataset, and $B_j$ may denote the j-th training dataset of the second battery dataset.

For example, the i-th or j-th training dataset may comprise input sequences of charging capacity relative to the number of charge/discharge cycles associated with their respective batteries. Once the optimal $\pi^*$ is obtained, based on the probabilities within the optimal $\pi^*$ it may be determined for a given input sequence in $A_i$ the input sequence in $B_j$ that shares the most similarity or vice versa.

At 840, command module 230 may update the local layers of each GLD transformer based on the optimal $\pi^*$ obtained in Equation (9). For example, for the j-th battery in the second battery dataset, command module 230 may determine the local parts of the GLD transformer associated with the j-th battery by using the local parts of the i'-th battery in the first dataset, where i' is determined based on:

$$i' = \text{argmax}_i \pi_j. \qquad \text{Equation (10)}$$

Accordingly, Equation (10) may be used m times to find the local parts of the first battery dataset that best correspond to second battery dataset based on the analysis of the input sequences.

At 850, command module 230 may increment the variable Step by 1.

At 860, command module 230 may optimize for one iteration each GLD transformer by using the input sequence of the battery in the second battery dataset associated with the GLD transformer, where the loss function is given by Equation (8).

At 870, if the value of Step is less than MaxStep, then command module 230 may return to step 850.

With respect to the above methods, method 700 may be seen as a method for initializing a set of GLD transformers in relation to an individual battery dataset, while method 800 may be seen as a method for taking advantage of useful information in a set of GLD transformers in a first battery dataset that can be applied to forming a second set of GLD transformers for a second battery dataset.

Such methods can be advantageous in the context of installing vehicle batteries. For example, when an arrangement of batteries is selected for use with a vehicle, a first set of such batteries may be extensively tested to form a detailed first battery dataset, including a set of GLD transformers within the first battery dataset (e.g., via method 700). When a second set of batteries is then installed in a production vehicle, the first battery dataset may be used to train and finetune the second set of batteries (e.g., via method 800).

In some embodiments, command module 230 may use information within a first battery dataset, a second battery dataset, or both to select a first battery set for training a second battery set. For example, based on the vehicle and battery type associated with a second battery set, command module 230 may select a first battery dataset associated with the same vehicle and battery type. As another example, based on the location or environment of the second battery dataset, command module 230 may select a first battery dataset associated with the location or environment (e.g., Detroit Metro; Humid Continental (Dfa/Dfb)).

In this manner, new or replacement batteries may be quickly trained using methods described herein based on a master battery dataset for the same battery type, same vehicle, same usage area, same climate, etc. For instance, a master battery dataset may be used to quickly train a replacement battery dataset, where the historical usage information within the master battery dataset satisfies one or more criteria (e.g., data regarding charging capacity relative to the number of charge/discharge cycles covers a range of capacity (e.g., from 100% to 80%)). In some embodiments, a master battery dataset may be used to quickly train a replacement battery dataset when the historical usage information within the replacement battery dataset satisfies one or more criteria (e.g., data regarding charging capacity relative to the number of charge/discharge cycles contains at least 10 charge/discharge cycles; the number of charge/discharge cycles recorded has increased by 10 charge/discharge cycles).

In some embodiments, when a battery dataset has satisfied one or more criteria, the historical usage of the battery dataset may be combined with the historical usage of a master battery dataset to create a new master battery dataset. For example, if the battery dataset has reached end of life, such that within the historical usage entries the data regarding charging capacity relative to the number of charge/discharge cycles covers a range of capacity (e.g., from 100% to 80%)), such a battery dataset may be merged with an existing master battery dataset to create a replacement master battery dataset. Such a replacement battery dataset may be generated by adding the battery entries, historical usage entries, and local parts entries for each battery to the replacement battery dataset. In addition, the global parts entry of one of the two battery datasets being merged may be copied over to the replacement battery dataset (e.g., based on whichever of the two battery datasets has the greatest number of battery entries), after which each historical usage entry for each battery entry is used to: optimize the local parts entry associated with the same battery entry; and the global parts entry of the replacement battery dataset.

Figure 9:
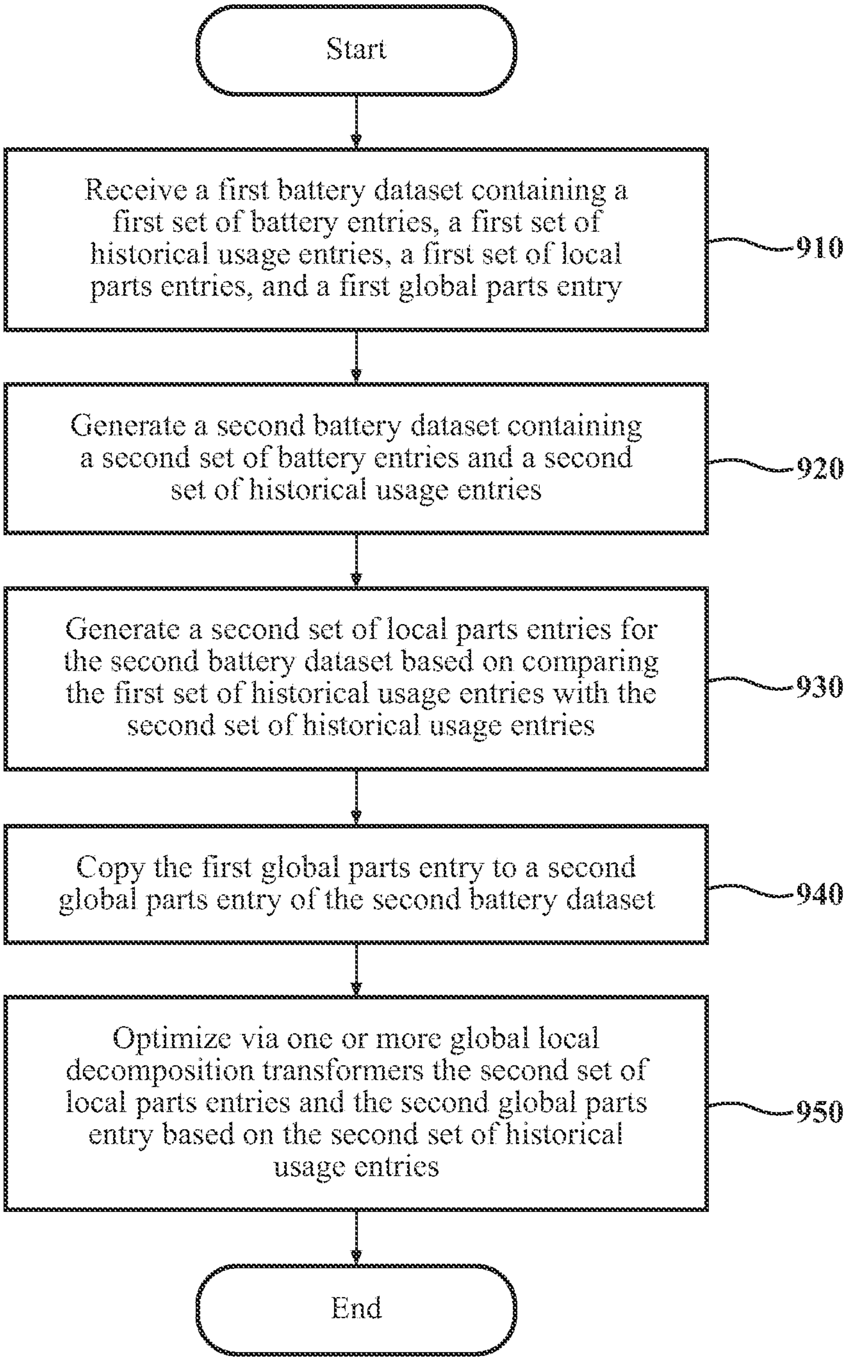
FIG. 9 illustrates one example of a method for implementing battery life prediction strategies.

FIG. 9 illustrates a flowchart of a method 900 that is associated with implementing battery life prediction strategies. Method 900 will be discussed from the perspective of the battery life prediction system 170 of FIGS. 1 and 2.

While method 900 is discussed in combination with the battery life prediction system 170, it should be appreciated that the method 900 is not limited to being implemented within battery life prediction system 170 but is instead one example of a system that may implement method 900.

At 910, command module 230 may receive a first battery dataset containing a first set of battery entries, a first set of historical usage entries, a first set of local parts entries, and a first global parts entry. For example, command module 230 may receive a master battery dataset for training an installation or master battery dataset. In some embodiments, the first battery dataset may need to satisfy one or more criteria (e.g., as specified by the vehicle), such as a vehicle type, location, or environment condition.

At 920, command module 230 may generate a second battery dataset containing a second set of battery entries and a second set of historical usage entries. For example, after vehicle 100 receives a new or replacement set of batteries may generate a second battery dataset and use it to record historical usage information for the new or replacement set of batteries.

At 930, command module 230 may generate a second set of local parts entries for the second battery dataset based on comparing the first set of historical usage entries with the second set of historical usage entries. For example, once enough historical usage information for the new or replacement set of batteries has been recorded (e.g., from battery sensors for 5 cycles), command module 230 may use a master battery dataset to configure the local part entries of the second battery data set.

At 940, command module 230 may copy the first global parts entry to a second global parts entry of the second battery dataset. For example, once enough historical usage information for the new or replacement set of batteries has been recorded (e.g., from battery sensors for 5 cycles), command module 230 may use a master battery dataset to configure the global part entry of the second battery data set.

At 950, command module 230 may optimize via one or more global local decomposition transformers the second set of local parts entries and the second global parts entry based on the second set of historical usage entries. For example, the one or more GLD transformers may be optimized using Equation (8) as described herein.

After 950, command module 230 may use the one or more GLD transformers associated with the second battery to predict a battery life (e.g., RUL), which may then be displayed to a vehicle operator via vehicle 100.

FIG. 1 will now be discussed in full detail as an example environment within which the system and methods disclosed herein may operate. In some instances, vehicle 100 is configured to switch selectively between various modes, such as an autonomous mode, one or more semi-autonomous operational modes, a manual mode, etc. Such switching may be implemented in a suitable manner, now known, or later developed. “Manual mode” means that all of or a majority of the navigation/maneuvering of the vehicle is performed according to inputs received from a user (e.g., human driver). In one or more arrangements, vehicle 100 may be a conventional vehicle that is configured to operate in only a manual mode.

In one or more embodiments, vehicle 100 is an autonomous vehicle. As used herein, “autonomous vehicle” refers to a vehicle that operates in an autonomous mode. “Autonomous mode” refers to using one or more computing systems to control vehicle 100, such as providing navigation/maneuvering of vehicle 100 along a travel route, with minimal or no input from a human driver. In one or more embodiments, vehicle 100 is either highly automated or completely automated. In one embodiment, vehicle 100 is configured with one or more semi-autonomous operational modes in which one or more computing systems perform a portion of the navigation/maneuvering of the vehicle along a travel route, and a vehicle operator (i.e., driver) provides inputs to the vehicle to perform a portion of the navigation/maneuvering of vehicle 100 along a travel route.

Vehicle 100 may include one or more processors 110. In one or more arrangements, processor(s) 110 may be a main processor of vehicle 100. For instance, processor(s) 110 may be an electronic control unit (ECU). Vehicle 100 may include one or more data stores 115 for storing one or more types of data. Data store(s) 115 may include volatile memory, non-volatile memory, or both. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. Data store(s) 115 may be a component of processor(s) 110, or data store 115 may be operatively connected to processor (s) 110 for use thereby. The term “operatively connected,” as used throughout this description, may include direct or indirect connections, including connections without direct physical contact.

In one or more arrangements, data store(s) 115 may include map data 116. Map data 116 may include maps of one or more geographic areas. In some instances, map data 116 may include information or data on roads, traffic control devices, road markings, structures, features, landmarks, or any combination thereof in the one or more geographic areas. Map data 116 may be in any suitable form. In some instances, map data 116 may include aerial views of an area. In some instances, map data 116 may include ground views of an area, including 360-degree ground views. Map data 116 may include measurements, dimensions, distances, information, or any combination thereof for one or more items included in map data 116. Map data 116 may also include measurements, dimensions, distances, information, or any combination thereof relative to other items included in map data 116. Map data 116 may include a digital map with information about road geometry. Map data 116 may be high quality, highly detailed, or both.

In one or more arrangements, map data 116 may include one or more terrain maps 117. Terrain map(s) 117 may include information about the ground, terrain, roads, surfaces, other features, or any combination thereof of one or more geographic areas. Terrain map(s) 117 may include elevation data in the one or more geographic areas. Terrain map(s) 117 may be high quality, highly detailed, or both. Terrain map(s) 117 may define one or more ground surfaces, which may include paved roads, unpaved roads, land, and other things that define a ground surface.

In one or more arrangements, map data 116 may include one or more static obstacle maps 118. Static obstacle map(s) 118 may include information about one or more static obstacles located within one or more geographic areas. A “static obstacle” is a physical object whose position does not change or substantially change over a period of time and whose size does not change or substantially change over a period of time. Examples of static obstacles include trees, buildings, curbs, fences, railings, medians, utility poles, statues, monuments, signs, benches, furniture, mailboxes, large rocks, hills. The static obstacles may be objects that extend above ground level. The one or more static obstacles included in static obstacle map(s) 118 may have location data, size data, dimension data, material data, other data, or any combination thereof, associated with it. Static obstacle map(s) 118 may include measurements, dimensions, distances, information, or any combination thereof for one or more static obstacles. Static obstacle map(s) 118 may be high quality, highly detailed, or both. Static obstacle map(s) 118 may be updated to reflect changes within a mapped area.

Data store(s) 115 may include sensor data 119. In this context, "sensor data" means any information about the sensors that vehicle 100 is equipped with, including the capabilities and other information about such sensors. As will be explained below, vehicle 100 may include sensor system 120. Sensor data 119 may relate to one or more sensors of sensor system 120. As an example, in one or more arrangements, sensor data 119 may include information on one or more LIDAR sensors 124 of sensor system 120.

In some instances, at least a portion of map data 116 or sensor data 119 may be located in data stores(s) 115 located onboard vehicle 100. Alternatively, or in addition, at least a portion of map data 116 or sensor data 119 may be located in data stores(s) 115 that are located remotely from vehicle 100.

As noted above, vehicle 100 may include sensor system 120. Sensor system 120 may include one or more sensors. "Sensor" means any device, component, or system that may detect or sense something. The one or more sensors may be configured to sense, detect, or perform both in real-time. As used herein, the term "real-time" means a level of processing responsiveness that a user or system senses as sufficiently immediate for a particular process or determination to be made, or that enables the processor to keep up with some external process.

In arrangements in which sensor system 120 includes a plurality of sensors, the sensors may work independently from each other. Alternatively, two or more of the sensors may work in combination with each other. In such an embodiment, the two or more sensors may form a sensor network. Sensor system 120, the one or more sensors, or both may be operatively connected to processor(s) 110, data store(s) 115, another element of vehicle 100 (including any of the elements shown in FIG. 1), or any combination thereof. Sensor system 120 may acquire data of at least a portion of the external environment of vehicle 100 (e.g., nearby vehicles).

Sensor system 120 may include any suitable type of sensor. Various examples of different types of sensors will be described herein. However, it will be understood that the embodiments are not limited to the particular sensors described. Sensor system 120 may include one or more vehicle sensors 121. Vehicle sensor(s) 121 may detect, determine, sense, or acquire in a combination thereof information about vehicle 100 itself. In one or more arrangements, vehicle sensor(s) 121 may be configured to detect, sense, or acquire in a combination thereof position and orientation changes of vehicle 100, such as, for example, based on inertial acceleration. In one or more arrangements, vehicle sensor(s) 121 may include one or more accelerometers, one or more gyroscopes, an inertial measurement unit (IMU), a dead-reckoning system, a global navigation satellite system (GNSS), a global positioning system (GPS), a navigation system 147, other suitable sensors, or any combination thereof. Vehicle sensor(s) 121 may be configured to detect, sense, or acquire in a combination thereof one or more characteristics of vehicle 100. In one or more arrangements, vehicle sensor(s) 121 may include a speedometer to determine a current speed of vehicle 100.

Alternatively, or in addition, sensor system 120 may include one or more environment sensors 122 configured to acquire, sense, or acquire in a combination thereof driving environment data. "Driving environment data" includes data or information about the external environment in which an autonomous vehicle is located or one or more portions thereof. For example, environment sensor(s) 122 may be configured to detect, quantify, sense, or acquire in any combination thereof obstacles in at least a portion of the external environment of vehicle 100, information/data about such obstacles, or a combination thereof. Such obstacles may be comprised of stationary objects, dynamic objects, or a combination thereof. Environment sensor(s) 122 may be configured to detect, measure, quantify, sense, or acquire in any combination thereof other things in the external environment of vehicle 100, such as, for example, lane markers, signs, traffic lights, traffic signs, lane lines, crosswalks, curbs proximate to vehicle 100, off-road objects, etc.

Various examples of sensors of sensor system 120 will be described herein. The example sensors may be part of the one or more environment sensor(s) 122, the one or more vehicle sensors 121, or both. However, it will be understood that the embodiments are not limited to the particular sensors described.

As an example, in one or more arrangements, sensor system 120 may include one or more radar sensors 123, one or more LIDAR sensors 124, one or more sonar sensors 125, one or more cameras 126, or any combination thereof. In one or more arrangements, camera(s) 126 may be high dynamic range (HDR) cameras or infrared (IR) cameras.

Vehicle 100 may include an input system 130. An "input system" includes any device, component, system, element or arrangement or groups thereof that enable information/data to be entered into a machine. Input system 130 may receive an input from a vehicle passenger (e.g., a driver or a passenger). Vehicle 100 may include an output system 135. An "output system" includes any device, component, or arrangement or groups thereof that enable information/data to be presented to a vehicle passenger (e.g., a person, a vehicle passenger, etc.).

Vehicle 100 may include one or more vehicle systems 140. Various examples of vehicle system(s) 140 are shown in FIG. 1. However, vehicle 100 may include more, fewer, or different vehicle systems. It should be appreciated that although particular vehicle systems are separately defined, each or any of the systems or portions thereof may be otherwise combined or segregated via hardware, software, or a combination thereof within vehicle 100. Vehicle 100 may include a propulsion system 141, a braking system 142, a steering system 143, throttle system 144, a transmission system 145, a signaling system 146, a navigation system 147, other systems, or any combination thereof. Each of these systems may include one or more devices, components, or combinations thereof, now known or later developed.

Navigation system 147 may include one or more devices, applications, or combinations thereof, now known or later developed, configured to determine the geographic location of the vehicle 100, to determine a travel route for vehicle 100, or to determine both. Navigation system 147 may include one or more mapping applications to determine a travel route for vehicle 100. Navigation system 147 may include a global positioning system, a local positioning system, a geolocation system, or any combination thereof.

Processor(s) 110, battery life prediction system 170, automated driving module(s) 160, or any combination thereof may be operatively connected to communicate with various aspects of vehicle system(s) 140 or individual components thereof. For example, returning to FIG. 1, processor(s) 110, automated driving module(s) 160, or a combination thereof may be in communication to send or receive information from various aspects of vehicle system(s) 140 to control the movement, speed, maneuvering, heading, direction, etc. of vehicle 100. Processor(s) 110, battery life prediction system 170, automated driving module(s) 160, or any combination thereof may control some or all of these vehicle system(s) 140 and, thus, may be partially or fully autonomous.

Processor(s) 110, battery life prediction system 170, automated driving module(s) 160, or any combination thereof may be operable to control at least one of the navigation or maneuvering of vehicle 100 by controlling one or more of vehicle systems 140 or components thereof. For instance, when operating in an autonomous mode, processor(s) 110, battery life prediction system 170, automated driving module(s) 160, or any combination thereof may control the direction, speed, or both of vehicle 100. Processor(s) 110, battery life prediction system 170, automated driving module(s) 160, or any combination thereof may cause vehicle 100 to accelerate (e.g., by increasing the supply of fuel provided to the engine), decelerate (e.g., by decreasing the supply of fuel to the engine, by applying brakes), change direction (e.g., by turning the front two wheels), or perform any combination thereof. As used herein, "cause" or "causing" means to make, force, compel, direct, command, instruct, enable, or in any combination thereof an event or action to occur or at least be in a state where such event or action may occur, either in a direct or indirect manner.

Vehicle 100 may include one or more actuators 150. Actuator(s) 150 may be any element or combination of elements operable to modify, adjust, alter, or in any combination thereof one or more of vehicle systems 140 or components thereof to responsive to receiving signals or other inputs from processor(s) 110, automated driving module(s) 160, or a combination thereof. Any suitable actuator may be used. For instance, actuator(s) 150 may include motors, pneumatic actuators, hydraulic pistons, relays, solenoids, and piezoelectric actuators, just to name a few possibilities.

Vehicle 100 may include one or more modules, at least some of which are described herein. The modules may be implemented as computer-readable program code that, when executed by processor(s) 110, implement one or more of the various processes described herein. One or more of the modules may be a component of processor(s) 110, or one or more of the modules may be executed on or distributed among other processing systems to which processor(s) 110 is operatively connected. The modules may include instructions (e.g., program logic) executable by processor(s) 110. Alternatively, or in addition, data store(s) 115 may contain such instructions.

In one or more arrangements, one or more of the modules described herein may include artificial or computational intelligence elements, e.g., neural network, fuzzy logic, or other machine learning algorithms. Further, in one or more arrangements, one or more of the modules may be distributed among a plurality of the modules described herein. In one or more arrangements, two or more of the modules described herein may be combined into a single module.

Vehicle 100 may include one or more autonomous driving modules 160. Automated driving module(s) 160 may be configured to receive data from sensor system 120 or any other type of system capable of capturing information relating to vehicle 100, the external environment of the vehicle 100, or a combination thereof. In one or more arrangements, automated driving module(s) 160 may use such data to generate one or more driving scene models. Automated driving module(s) 160 may determine position and velocity of vehicle 100. Automated driving module(s) 160 may determine the location of obstacles, obstacles, or other environmental features including traffic signs, trees, shrubs, neighboring vehicles, pedestrians, etc.

Automated driving module(s) 160 may be configured to receive, determine, or in a combination thereof location information for obstacles within the external environment of vehicle 100, which may be used by processor(s) 110, one or more of the modules described herein, or any combination thereof to estimate: a position or orientation of vehicle 100; a vehicle position or orientation in global coordinates based on signals from a plurality of satellites or other geolocation systems; or any other data/signals that could be used to determine a position or orientation of vehicle 100 with respect to its environment for use in either creating a map or determining the position of vehicle 100 in respect to map data.

Automated driving module(s) 160 either independently or in combination with battery life prediction system 170 may be configured to determine travel path(s), current autonomous driving maneuvers for vehicle 100, future autonomous driving maneuvers, modifications to current autonomous driving maneuvers, etc. Such determinations by automated driving module(s) 160 may be based on data acquired by sensor system 120, driving scene models, data from any other suitable source such as determinations from sensor data 250, or any combination thereof. In general, automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of vehicle 100, changing travel lanes, merging into a travel lane, and reversing, just to name a few possibilities. Automated driving module(s) 160 may be configured to implement driving maneuvers. Automated driving module(s) 160 may cause, directly or indirectly, such autonomous driving maneuvers to be implemented. As used herein, "cause" or "causing" means to make, command, instruct, enable, or in any combination thereof an event or action to occur or at least be in a state where such event or action may occur, either in a direct or indirect manner. Automated driving module(s) 160 may be configured to execute various vehicle functions, whether individually or in combination, to transmit data to, receive data from, interact with, or to control vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components, or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory communicably coupled to the processor and storing machine-readable instructions that, when executed by the processor, cause the processor to:

receive a first battery dataset containing a first set of battery entries, a first set of historical usage entries, a first set of local parts entries, and a first global parts entry;

generate a second battery dataset containing a second set of battery entries and a second set of historical usage entries;

generate a second set of local parts entries for the second battery dataset based on comparing the first set of historical usage entries with the second set of historical usage entries;

copy the first global parts entry to a second global parts entry of the second battery dataset; and optimize via one or more global local decomposition transformers the second set of local parts entries and the second global parts entry based on the second set of historical usage entries.

2. The system of claim 1, wherein the machine-readable instructions to generate the second battery dataset further includes utilizing battery sensors on a vehicle to provide the second set of historical usage entries.

3. The system of claim 1, wherein the first set of historical usage entries contains for each historical usage entry at least one record of a charging capacity relative to a number of charge/discharge cycles where the charging capacity is below a threshold.

4. The system of claim 1, wherein the machine-readable instructions that, when executed by the processor, further includes causing the processor to:

satisfy a vehicle type condition specified by a vehicle based on the first battery dataset.

5. The system of claim 1, wherein the machine-readable instructions that, when executed by the processor, further includes causing the processor to:

satisfy a location condition specified by a vehicle based on the first battery dataset.

6. The system of claim 1, wherein the machine-readable instructions that, when executed by the processor, further includes causing the processor to:

satisfy an environment condition specified by a vehicle based on the first battery dataset.

7. The system of claim 2, wherein the machine-readable instructions that, when executed by the processor, further includes causing the processor to:

determine a battery life prediction based on the second battery dataset; and display the battery life prediction.

8. A non-transitory computer-readable medium including instructions that when executed by one or more processors cause the one or more processors to:

receive a first battery dataset containing a first set of battery entries, a first set of historical usage entries, a first set of local parts entries, and a first global parts entry;

generate a second battery dataset containing a second set of battery entries and a second set of historical usage entries;

generate a second set of local parts entries for the second battery dataset based on comparing the first set of historical usage entries with the second set of historical usage entries;

copy the first global parts entry to a second global parts entry of the second battery dataset; and optimize via one or more global local decomposition transformers the second set of local parts entries and the second global parts entry based on the second set of historical usage entries.

9. The non-transitory computer-readable medium of claim 8, wherein the instructions to generate the second battery dataset further includes utilizing battery sensors on a vehicle to provide the second set of historical usage entries.

10. The non-transitory computer-readable medium of claim 8, wherein the first set of historical usage entries contains for each historical usage entry at least one record of a charging capacity relative to a number of charge/discharge cycles where the charging capacity is below a threshold.

11. The non-transitory computer-readable medium of claim 8, further comprising instructions that when executed by one or more processors cause the one or more processors to:

satisfy a vehicle type condition specified by a vehicle based on the first battery dataset.

12. The non-transitory computer-readable medium of claim 8, further comprising instructions that when executed by one or more processors cause the one or more processors to:

satisfy a location condition specified by a vehicle based on the first battery dataset.

13. The non-transitory computer-readable medium of claim 9, further comprising instructions that when executed by one or more processors cause the one or more processors to:

determine a battery life prediction based on the second battery dataset; and display the battery life prediction.

14. A method, comprising:

receiving a first battery dataset containing a first set of battery entries, a first set of historical usage entries, a first set of local parts entries, and a first global parts entry;

generating a second battery dataset containing a second set of battery entries and a second set of historical usage entries;

generating a second set of local parts entries for the second battery dataset based on comparing the first set of historical usage entries with the second set of historical usage entries;

copying the first global parts entry to a second global parts entry of the second battery dataset; and optimizing via one or more global local decomposition transformers the second set of local parts entries and the second global parts entry based on the second set of historical usage entries.

15. The method of claim 14, further comprising:

utilizing battery sensors on a vehicle to provide the second set of historical usage entries.

16. The method of claim 14, wherein the first set of historical usage entries contains for each historical usage entry at least one record of a charging capacity relative to a number of charge/discharge cycles where the charging capacity is below a threshold.

17. The method of claim 14, further comprising:

satisfying a vehicle type condition specified by a vehicle based on the first battery dataset.

18. The method of claim 14, further comprising:

satisfying a location condition specified by a vehicle based on the first battery dataset.

19. The method of claim 14, further comprising:

satisfying an environment condition specified by a vehicle based on the first battery dataset.

20. The method of claim 15, further comprising:

determining a battery life prediction based on the second battery dataset; and displaying the battery life prediction.

* * * * *